(No Model.) 4 Sheets—Sheet 1.
H. J. CASE.
GRAIN HARVESTER.
No. 559,480. Patented May 5, 1896.
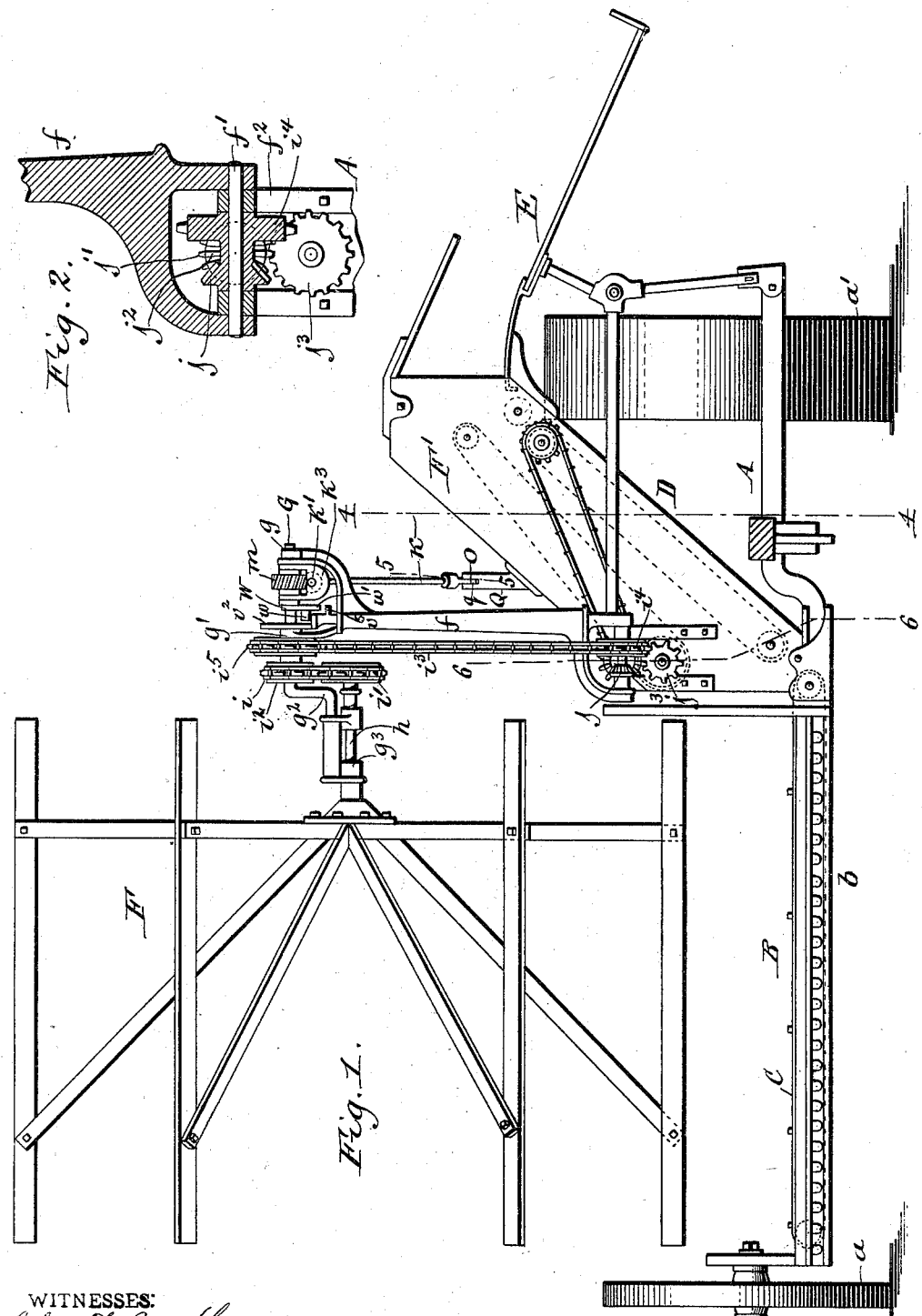
WITNESSES:
Chas. F. Burkhardt
Theo. L. Popp
Henry J. Case
By Wilhelm Bonner
INVENTOR.
ATTORNEYS.

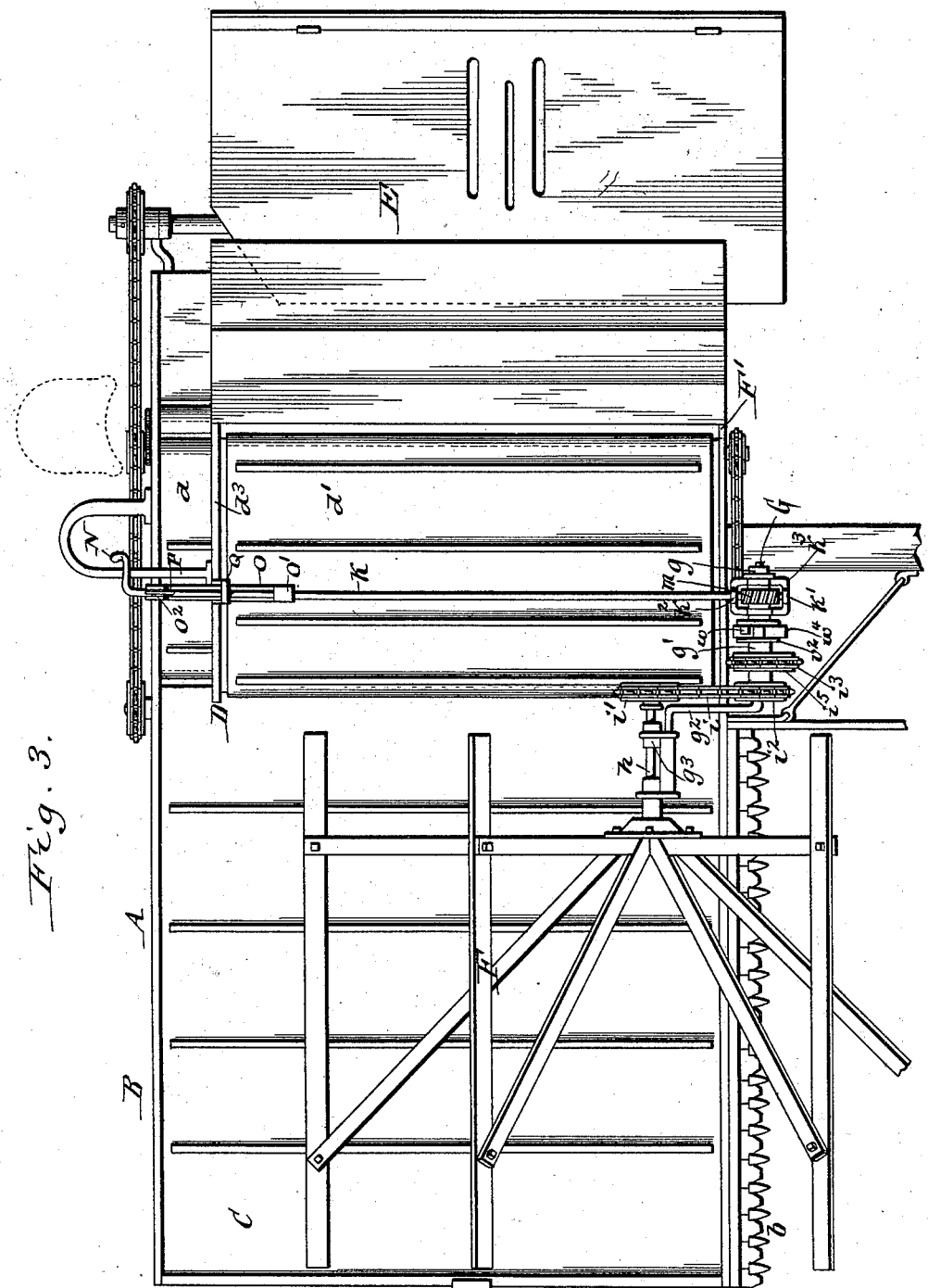

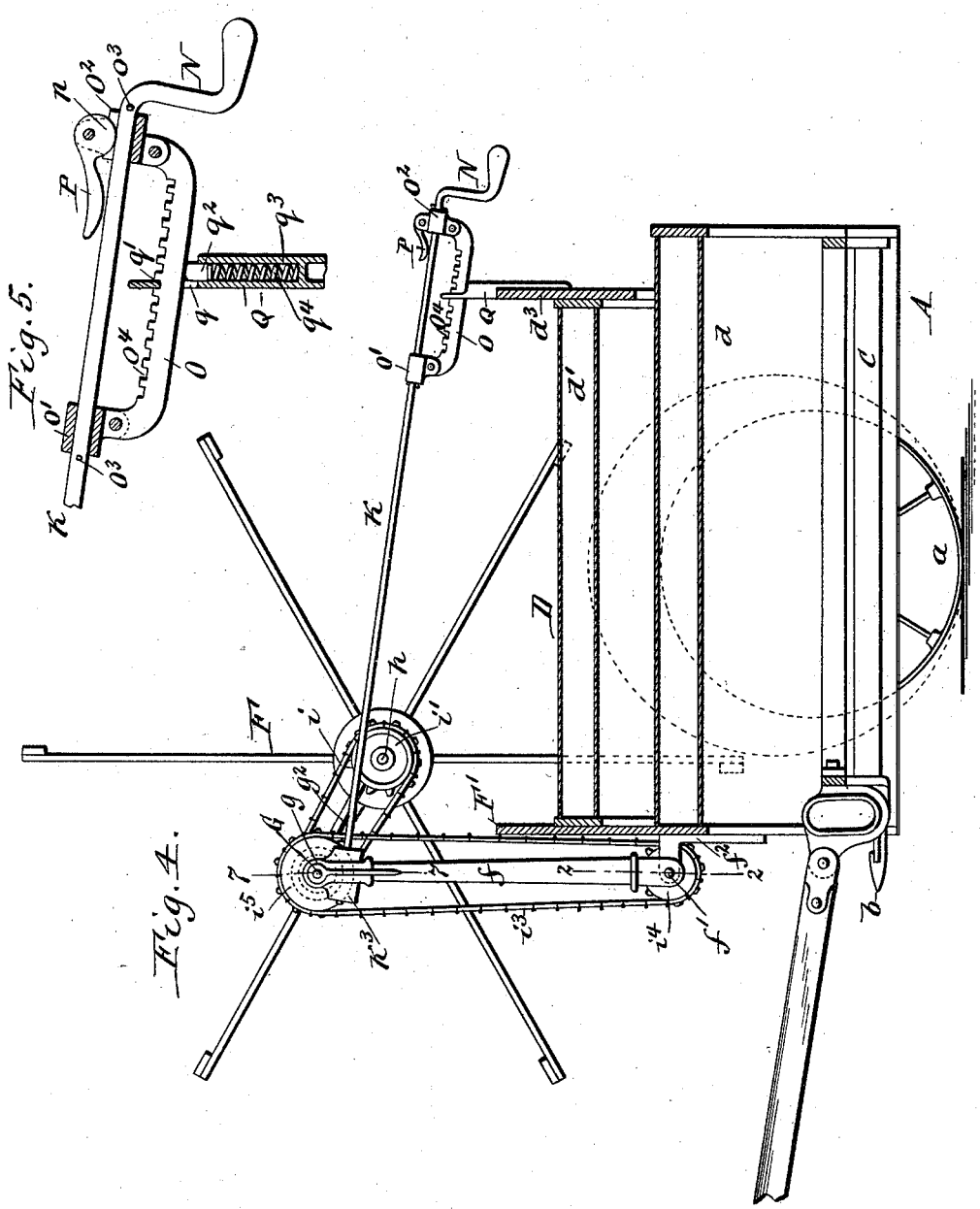

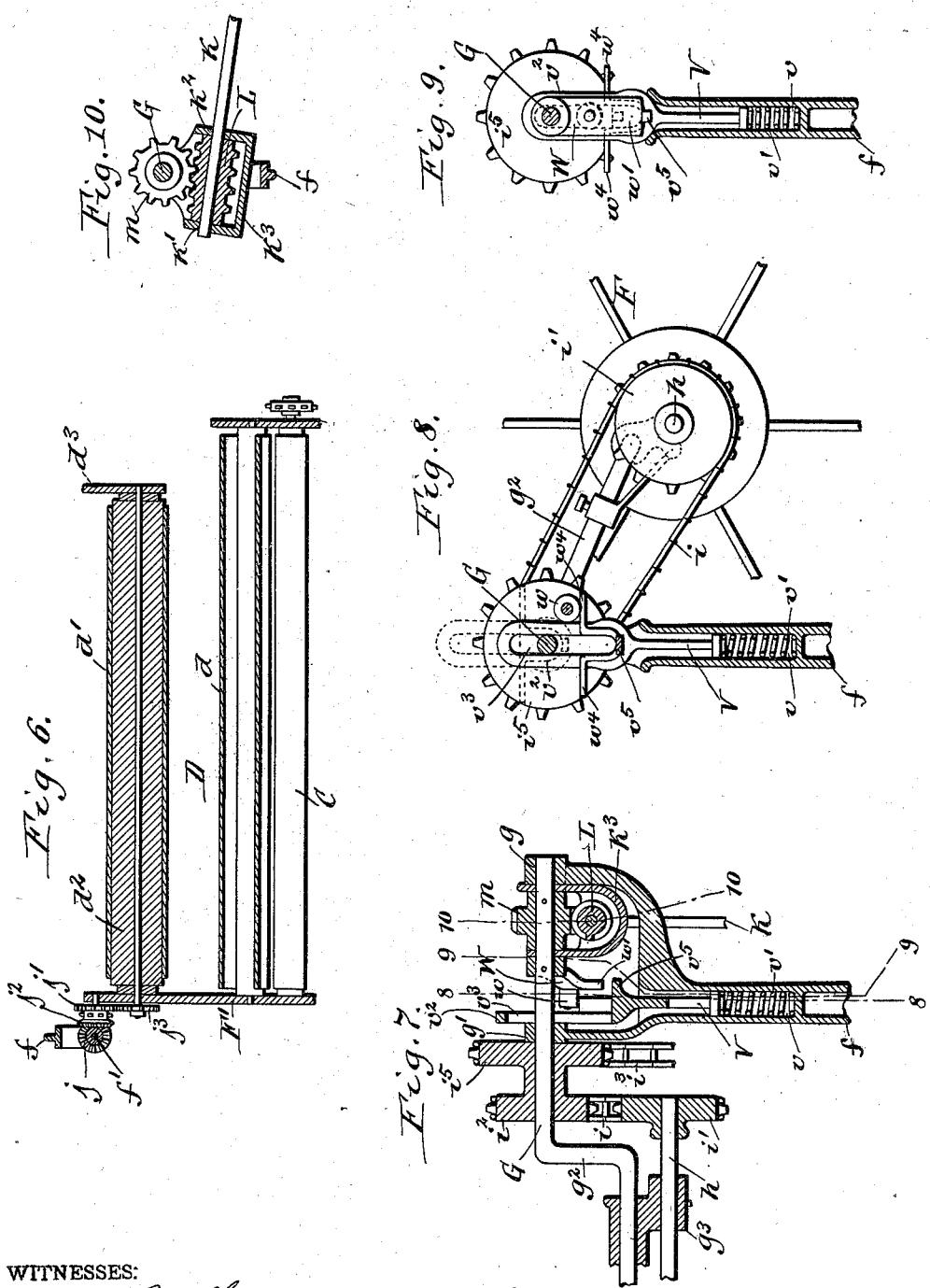

UNITED STATES PATENT OFFICE.

HENRY J. CASE, OF OWASCO, NEW YORK, ASSIGNOR TO THE JOHNSTON HARVESTER COMPANY, OF BATAVIA, NEW YORK.

GRAIN-HARVESTER.

SPECIFICATION forming part of Letters Patent No. 559,480, dated May 5, 1896.

Application filed March 18, 1895. Serial No. 542,082. (No model.)

*To all whom it may concern:*

Be it known that I, HENRY J. CASE, a citizen of the United States, residing at Owasco, in the county of Cayuga and State of New York, have invented a new and useful Improvement in Grain-Harvesters, of which the following is a specification.

This invention relates to that class of grain-harvesters in which the cut grain is directed upon the conveyer-platform by a rotating reel, and has the object to improve the reel-adjusting mechanism so as to secure a greater range of adjustment of the reel and permit the same to be adjusted more easily.

In the accompanying drawings, consisting of four sheets, Figure 1 is a front elevation of my improved harvester, the draft-pole being shown in section. Fig. 2 is a fragmentary vertical section, on an enlarged scale, of the lower end of the rocking-reel standard and adjacent parts, taken in line 2 2, Fig. 4. Fig. 3 is a top plan view of the harvester. Fig. 4 is a vertical longitudinal section in line 4 4, Fig. 1. Fig. 5 is a fragmentary sectional elevation, on an enlarged scale, of the rear portion of the reel-adjusting device, taken in line 5 5, Fig. 1. Fig. 6 is a vertical longitudinal section in line 6 6, Fig. 1. Fig. 7 is a vertical section, on an enlarged scale, of the reel-balancing device and connecting parts, the section being taken in line 7 7, Fig. 4. Fig. 8 is a vertical section in line 8 8, Fig. 7, showing the position of the balancing device when the reel is partly elevated. Fig. 9 is a similar section in line 9 9, Fig. 7, showing the position of the balancing device when the reel is in its lowest position. Fig. 10 is a vertical section in line 10 10, Fig. 7.

Like letters of reference refer to like parts in the several figures.

A represents the main frame of the harvester, which is supported at the grainward side by a grain-wheel $a$ and at its stubbleward side by a master or drive wheel $a'$.

B represents the horizontal platform arranged on the grainward side of the master-wheel, $b$ the cutter mechanism arranged along the front end of the platform, and C the horizontal platform conveyer or apron whereby the cut grain is carried from the grainward to the stubbleward end of the platform.

D represents the inclined elevator whereby the grain is carried from the delivery end of the platform to the binder-deck E, and which consists of a lower elevator-apron $d$ and an upper elevator-apron $d'$.

F represents the usual reel which is arranged over the platform and cutter mechanism and whereby the grain is directed upon the platform. This reel is driven and adjusted to suit different heights and conditions of grain by the following mechanism:

$f$ represents a rocking standard which is arranged in front of the elevator and which is pivoted with its bifurcated lower end by a horizontal pin $f'$ to a bracket $f^2$, arranged on the front end board F' of the elevator, so that the standard is capable of swinging back and forth with its upper end.

G represents a horizontal crank-shaft which is journaled transversely in bearings $g\ g'$, arranged on the bifurcated upper end of the rocking standard and which is provided on its end facing the reel with a crank $g^2$. This crank is provided at its free end with a bearing $g^3$, in which the shaft $h$, supporting the reel, is journaled. The crank clears the grain-ward side of the rocking standard and is therefore capable of making a complete revolution for raising and lowering the reel and shifting the same backward and forward.

$i$ represents a chain belt which passes around a sprocket-wheel $i'$, secured to the inner end of the reel-shaft, and a sprocket-wheel $i^2$, journaled on the crank-shaft adjacent to the crank-arm.

$i^3$ is a chain belt which passes around a sprocket-wheel $i^4$, journaled on the pivot-pin of the rocking standard, and a sprocket-wheel $i^5$, journaled on the crank-shaft and formed in one piece with or otherwise connected with the sprocket-wheel $i^2$. Motion is transmitted to the sprocket-wheel $i^4$ from any moving part of the harvester in any suitable manner, preferably, as shown, by means of a bevel gear-wheel $j$, formed in one piece with or otherwise secured to the sprocket-wheel $i^4$, an idler gear-wheel $j'$, provided with a bevel gear-wheel $j^2$, which meshes with the bevel-gear $j$, and a gear-wheel $j^3$, secured to the shaft of the receiving-roller $d^2$ of the upper elevator-apron and meshing with the idler-wheel $j'$.

This construction of the driving and supporting mechanism permits the crank-shaft to make a complete revolution for raising and lowering the reel and shifting the same backward and forward within certain limits, and the rocking standard can be rocked for shifting the reel backward and forward a considerable distance without disturbing the driving mechanism.

$k$, Figs. 1, 3, 4, 5, 7, and 10, represents a shifting rod or shaft whereby the position of the reel is adjusted and which is arranged lengthwise over the elevator. This rod is journaled at its front end in bearings $k'$ $k^2$, Figs. 7 and 10, formed in a hanger $k^3$, which is hung loosely on the crank-shaft G adjacent to the inner side of the bearing $g$.

L is a worm which is secured to the adjusting-rod between the bearings $k'$ $k^2$ and whereby the rod is held against lengthwise movement in the hanger. This worm meshes with a worm-wheel $m$, secured to the crank-shaft. Upon turning the adjusting-rod by means of a hand-crank N at the rear end thereof the crank-shaft of the reel is turned, thereby raising or lowering the reel and shifting it forward or backward as far as the throw of the crank-shaft permits.

O, Figs. 1, 3, 4, and 5, represents an adjusting-bar arranged lengthwise underneath the rear portion of the adjusting-rod and provided at its ends with upwardly-projecting bearings $O'$ $O^2$, in which the adjusting-rod is journaled, but held against lengthwise movement therein by suitable means—for instance, by pins $O^3$ bearing against the ends of the bearings.

P is a clamping-lever pivoted to the rear bearing $O^2$ and provided with a cam $p$, which bears against the adjusting-rod and holds the latter against turning after the crank-shaft has been turned to the desired position. In addition to being capable of turning for adjusting the reel by turning the crank-shaft the adjusting-rod is also capable of being shifted lengthwise for the purpose of adjusting the crank-shaft backwardly and forwardly by swinging the rocking standard, whereby a greater range of lengthwise adjustment of the reel is obtained. For this purpose the adjusting-bar is arranged to slide through a vertical slot $q$, formed in the upper end of a standard Q, secured to the upper rear end board $d^3$ of the elevator. The upper side of the adjusting-bar is provided with a row of notches $O^4$, which are adapted to engage with a stop $q'$, formed by the upper edge of the slot in the standard for holding the rocking standard in its adjusted position. $q^2$ is a follower bearing against the under side of the adjusting-bar and guided in a vertical socket $q^3$, formed in the upper end of the standard, and $q^4$ is a spring arranged in said socket and bearing with its ends against the under side of the follower and the bottom of the socket, whereby the notches of the adjusting-bar are yieldingly held in engagement with the stop $q'$ of the standard. When it is desired to shift the rocking standard for adjusting the reel, the adjusting rod and bar are depressed sufficiently to disengage the notch of the latter from the stop of the stationary standard, after which the adjusting-rod can be moved backward or forward to shift the rocking standard to the desired position. After the rocking standard has been readjusted the adjusting rod and bar are elevated and interlocked with the stop of the standard by the spring $q^4$. When the reel is arranged backward or forward of the crank-shaft, its weight causes the worm-wheel to bear against the worm with considerable pressure, and it requires considerable power to adjust the reel. In order to permit the crank-shaft to be turned more easily for adjusting the reel, a balancing device is provided, which is constructed as follows:

V, Figs. 1, 7, 8, and 9, represents a vertically-movable presser-rod which is guided in a socket $v$, formed in the upper portion of the rocking standard, and which is constantly pressed upwardly by a spring $v'$, arranged in said socket and bearing with its ends against the lower end of the presser-rod and the bottom of the socket. The upper end of the presser-rod is provided with a balancing-head $v^2$, having a vertical slot $v^3$, through which the crank-shaft passes.

W represents a balancing-arm secured to the crank-shaft and provided with a roller $w$, which is arranged in a line connecting the axis of the reel with that of the crank-shaft. This roller is adapted to bear against horizontal flanges or bearing-plates $v^4$, formed on the balancing-head on opposite sides of the slot $v^3$. While the axis of the reel is arranged in front or in rear of the axis of the crank-shaft one of the bearing-plates is pressed upwardly against the roller of the balancing-arm, thereby carrying a portion of the weight of the reel and permitting the same to be adjusted more easily. The slot in the balancing-head is of such length that the bearing-plates can follow the roller of the balancing-arm and bear firmly against the same while the axis of the reel is on either side of the axis of the crank-shaft. The bearing-plates on opposite sides of the slot in the balancing-head are separated by a gap which permits the bearing-plates to clear the crank-shaft as the balancing-head is raised and lowered. When the balancing-roller arrives near its highest position, the balancing-head is held against further upward movement by the lower end of its slot engaging against the under side of the crank-shaft, as represented in dotted lines, Fig. 8, during which time the balancing-roller passes from one of the bearing-plates across the gap to the other bearing-plate, thereby preventing the roller from becoming caught in the gap. In order to enable the balancing-roller to pass from one of the bearing-plates to the other without entering the gap while in its lowest position, the balancing-arm is provided beyond the roller with an extension or guard $w'$, which is adapted to bear down against a ledge $v^5$ on the balancing-head, as represented in Fig. 9, during the time that the balancing-roller is crossing the gap between the bearing-plates and holds the balancing-head in a depressed position, so that the balancing-roller will not be caught in said gap. By this means the difficulty of disengaging said roller from the gap, which otherwise would occur, is avoided and the reel can be shifted easily to any position by turning the crank-shaft.

I claim as my invention—

1. In a grain-harvester, the combination with a standard, of a shaft journaled in said standard and provided with a crank capable of being shifted from one side of the standard to the other, a reel mounted on said crank, an adjusting device connected with said shaft and whereby said reel is shifted, a balancing-arm secured to said shaft, and a spring bearing against said balancing-arm and adapted to partially support the weight of the reel when the latter is arranged on one side or the other of the standard, substantially as set forth.

2. In a grain-harvester, the combination with a standard, of a shaft journaled in said standard and provided with a crank capable of being shifted from one side of the standard to the other, a reel mounted on said crank, an adjusting device connected with said shaft and whereby said reel is shifted, a balancing-arm secured to said shaft, a presser-rod provided with a plate bearing against the balancing-arm, and a spring bearing against said presser-rod, substantially as set forth.

3. In a grain-harvester, the combination with a crank-shaft supporting the reel, of a balancing-arm secured to the crank-shaft, a presser-rod capable of moving toward and from the crank-shaft, a balancing-head arranged on the presser-rod and provided with a slot through which the crank-shaft passes, bearing-plates arranged on the balancing-head on opposite sides of its slot and adapted to bear against said balancing-arm, and a spring whereby the presser-rod is moved toward the crank-shaft, substantially as set forth.

4. In a grain-harvester, the combination with a crank-shaft supporting the reel, of a balancing-arm secured to the crank-shaft, a presser-rod capable of moving toward and from the crank-shaft, a balancing-head arranged on the presser-rod and provided with a slot through which the crank-shaft passes bearing-plates arranged on the balancing-head on opposite sides of its slot and adapted to bear against said balancing-arm, a spring whereby the presser-rod is moved toward the crank-shaft, a ledge arranged on the balancing-head adjacent to one of its slots and a guard or extension formed on the balancing-arm and adapted to bear against said ledge, substantially as set forth.

Witness my hand this 1st day of March, 1895.

HENRY J. CASE.

Witnesses:
GEO. C. FARRALL,
D. W. SPENCER.